Oct. 27, 1942.   H. T. LANGABEER ET AL   2,300,296
POWER PLANT
Filed May 3, 1940                4 Sheets-Sheet 3

H. T. LANGABEER
D. E. TRUCKSESS
INVENTORS
BY
ATTORNEY

Patented Oct. 27, 1942

2,300,296

UNITED STATES PATENT OFFICE 2,300,296

POWER PLANT

Harvey T. Langabeer, Baldwin, N. Y., and David E. Trucksess, Summit, N. J., assignors to Bell Telephone Laboratories, Incorporated, New York, N. Y., a corporation of New York Application May 3, 1940, Serial No. 333,072

21 Claims. (Cl. 171—314)

This invention relates to power plants in which regulated rectifiers, used in connection with a floating storage battery, are employed to transfer energy from a power source to a variable direct current load across which the battery is connected, and particularly to a system for automatically varying the number of rectifiers supplying the load in accordance with the load requirements.

The principal object of the invention is to automatically vary the number of regulated rectifiers supplying a direct current load in accordance with load requirements so that, at no time, are there in service more rectifiers than are necessary to take care of the load.

In accordance with a feature of the invention, this object is attained by the provision of means which function automatically to progressively increase the number of rectifiers in service as the load increases beyond predetermined limits and to automatically disconnect the rectifiers, in the reverse order, as the load decreases.

Another feature of the invention resides in the use of a single voltage regulating circuit for all the rectifiers of the plant and in the provision of means for associating the control means of the regulating circuit with the last rectifier placed in service and for transferring the control means from said last rectifier to a preceding rectifier when load conditions warrant the removal of the said last rectifier from service.

A further feature of the invention contemplates the use of a time delay mechanism which serves to delay the transfer of the regulating circuit control means to a rectifier for a predetermined interval of time following the connection of the rectifier to the load.

A still further feature of the invention resides in a novel type of regulating circuit which functions to vary the number of rectifiers in service in accordance with load requirements. This circuit involves a bridge circuit connected across the battery and in whose galvanometer arm there are included three serially connected relays, two of which are polarized and selectively respond to bridge unbalances produced by voltage variations from the regulated value of voltage of the battery, to control the operation of means which function to adjust the output of the rectifier, and the third of which responds to a bridge unbalance of greater predetermined magnitude to determine, in conjunction with other selecting relays, whether a rectifier should be started or stopped to meet the varying load conditions.

These and other features of the invention will be readily understood from the following detailed description made with reference to the accompanying drawings in which the several figures, when arranged in the manner indicated in Fig. 5, constitute a complete power plant involving three single phase full-wave rectifiers using two-element gas-filled rectifier tubes as a means for transferring energy from an alternating current source to a direct current load across which a storage battery is floated. The load and battery are illustrated in the lower right portion of Fig. 3, the lower left portion of which constitutes a voltage regulating circuit which responds to variations in the voltage of the storage battery to cause a corresponding adjustment of the output of the rectifiers of Figs. 1 and 4 to which it is common. The rectifiers of Fig. 4 represented by the block diagrams are intended to be similar to the rectifier shown in detail in Fig. 1.

Before entering into a detailed description of the operation of the complete system illustrated, a brief description of the rectifier circuit shown in Fig. 1 and also of the regulator circuit disclosed in Fig. 3 will be made.

The transformer T2 supplies filament voltage to the rectifier tubes V1 and V2 when the contactor relay 26 operates to connect the rectifier to the alternating current source 15. The direct current output is measured by an ammeter relay AR which indicates the current as well as acting as a relay. The output current is controlled by changing the plate voltage applied to the tubes.

The plate voltage applied to the tubes is changed by means of a booster control equipment consisting of a motor-driven, continuously tapped autotransformer TR and an insulating booster transformer T3 to raise the primary of the plate transformer T1 above the line voltage. The variable transformer TR operates in a manner similar to a motor-driven rheostat except instead of cutting in and out resistance, it cuts in and out turns of an autotransformer. As the number of turns in use is increased or decreased, the voltage across the primary of transformer T3 is raised or lowered respectively. Raising the voltage on the primary of transformer T3 causes a corresponding increase in the secondary voltage of this transformer. The secondary of transformer T3 is connected in series aiding with the primary of plate transformer T1, so that the transformer TR controls the output of the rectifier by raising or lowering the secondary voltage of plate transformer T1 which is the voltage applied to the plates of rectifier tubes V1 and V2.

The motor M associated with the transformer TR is controlled by the operation of relays 10 and 11. When relay 10 operates, the motor M is rotated in a direction to move the contact arm 12 in a counter-clockwise direction to connect more turns in series with the primary of transformer T3 and thus raise the rectifier output. When relay 11 is operated the motor contact arm 12 is rotated in the reverse direction to decrease the number of turns in series with the primary of transformer T3 and thus lower the rectifier output.

The motor M is an alternating current capacitor type which is operated on single phase current by means of a condenser 14 connected in parallel with one winding. By transferring the condenser from one winding to the other, the direction of rotation is reversed. Relays 10 and 11 function to switch condenser 14 from one motor winding to the other and also to connect the motor to the line L.

Figures 1, 5:
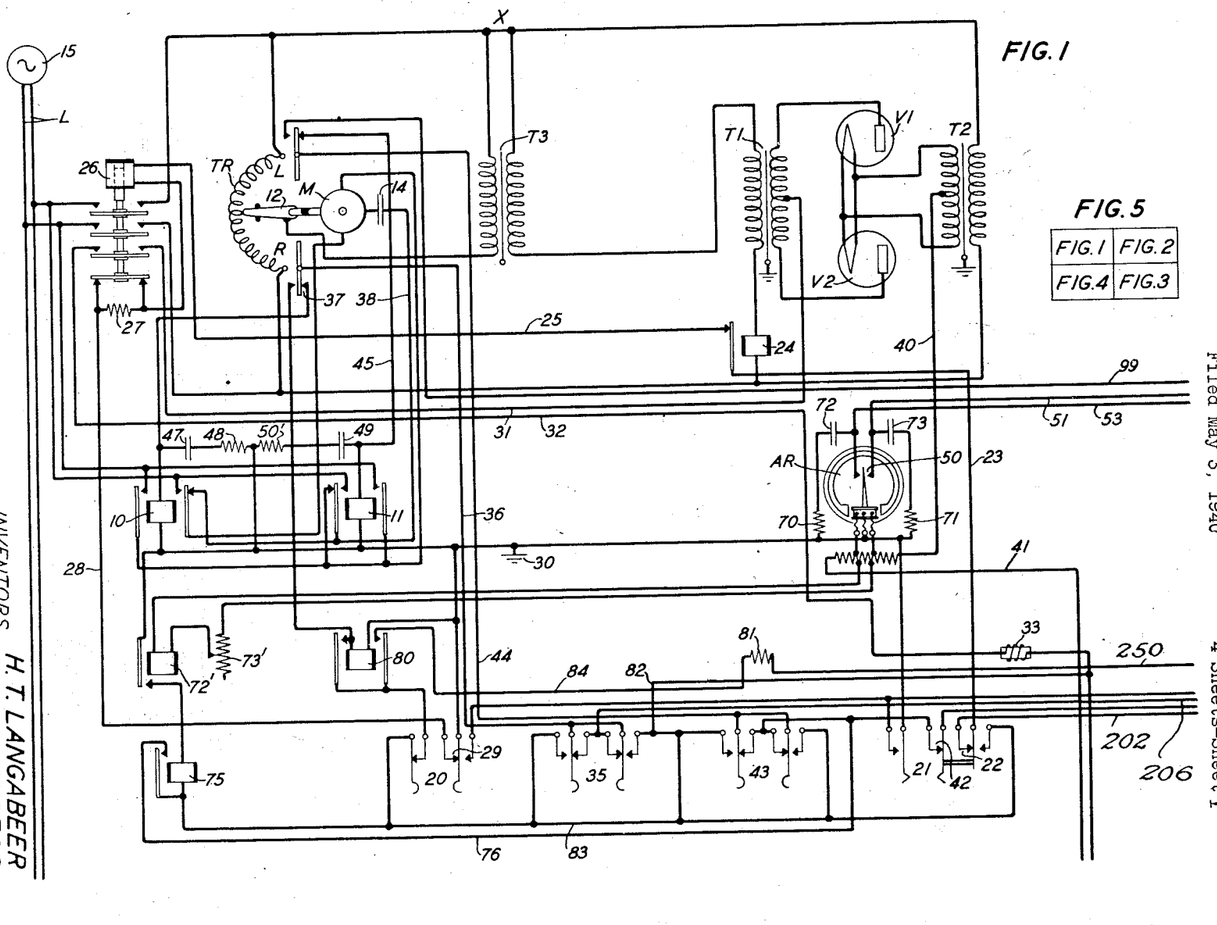
Figure 3:
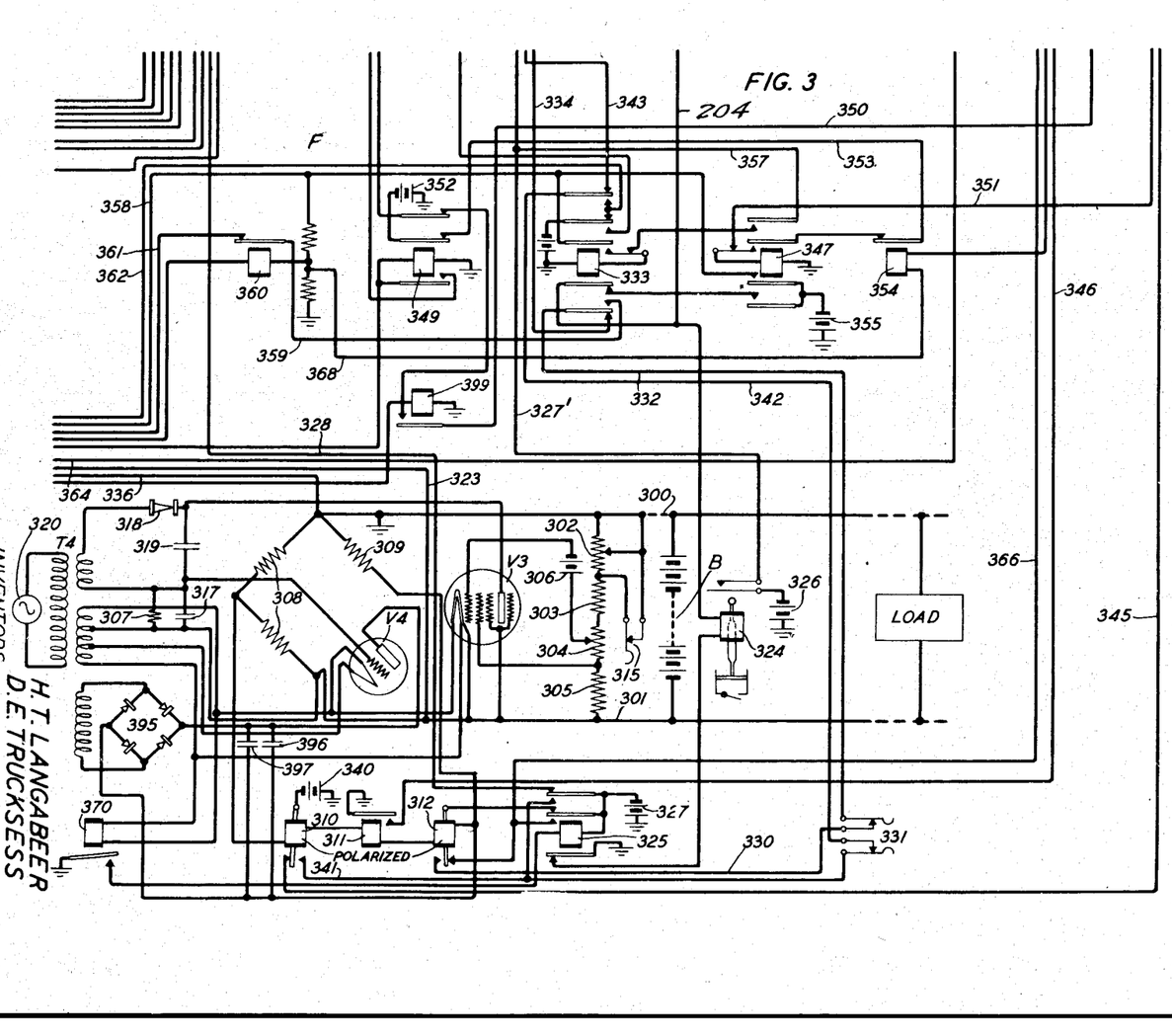
Figure 4:
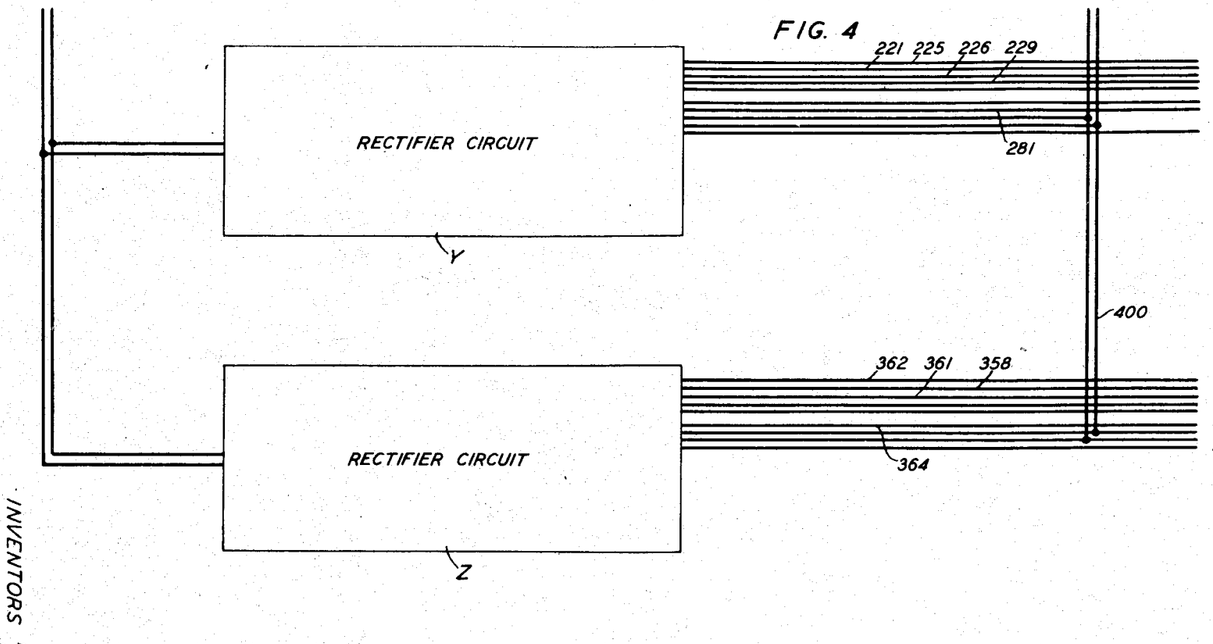

The voltage control equipment, which occupies the lower half of Fig. 3, serves to control the output of the rectifiers shown in detail in Fig. 1 and in block form in Fig. 4 and thereby maintain a constant battery voltage. The leads 300 and 301 connect the battery B to the regulating circuit. The charging rheostat 302, resistance 303, regulating rheostat 304 and resistance 305 form a potentiometer connected across the battery B. A positive potential, with respect to the cathode of amplifier tube V3, is taken off the potentiometer at the rheostat 304 and is opposed by a slightly higher grid battery 306, the difference in potential of approximately −1.25 volts being applied to the grid of vacuum tube V3. Variations of the battery voltage then reflect inversely to the grid of the amplifier tube V3. The small changes in grid voltage are amplified by V3 from a fraction of a volt to approximately seven volts. This amplifier output voltage appears as a voltage drop across resistance 307 which is applied to the grid of tube V4 in the regulator bridge circuit. The condenser 317 filters the amplified output voltage of amplifier V3 to prevent modulation of V4.

The varistor 318, condenser 319 and upper secondary winding of transformer T4 serve as a small half-wave rectifier to provide a direct current plate voltage for the amplifier tube V3. The plate voltage for tube V4 is derived from the rectifier 395 across whose output terminals are connected the condensers 396 and 397.

Vacuum tube V4 and resistances 308 and 309 form a bridge circuit, the plate-cathode resistance of tube V4 constituting one arm of the bridge. Relays 310, 311 and 312 are connected in series across the galvanometer corners of the bridge. The battery B is connected across the bridge by way of the leads 300 and 301. When the voltage of battery B is at the regulated value, the voltage applied to the grid of tube V4 is a value which provides a plate-cathode resistance which balances the bridge. At such a time, no current flows through the windings of relays 310, 311 and 312.

If the regulated voltage reduces below the floating range, this change in voltage is reflected through the potentiometer 302, 303, 304 and 305 to the grid of tube V4, which amplifies the change but reduces the magnitude of the voltage applied to the grid of tube V4. This change in grid voltage unbalances the bridge in a direction to cause current to flow in the relay circuit in a direction to operate the polarized relay 312, but does not operate the polarized relay 310 since the current flow is opposite to its polarization. Relay 312 operates so as to cause relay 10 in the rectifier circuit to operate in a manner to be more fully described hereinafter. Relay 10 operated, as mentioned previously, causes the output current of the rectifier to be increased and thus to bring the battery voltage back into the floating range. When this takes place, the regulator bridge is restored to balance and relay 312 releases.

If the regulated voltage should increase, this small change in voltage is reflected to the potentiometer 302, 303, 304, 305 and amplifier V3 in the same manner as described above, but in this case the magnitude of the grid voltage of tube V4 is increased which causes an unbalance of the bridge in the opposite direction, resulting in a reversal of the direction of current through the bridge relays, and relay 310 operates. As will appear more fully hereinafter relay 310 operated, causes relay 11 in the rectifier circuit to function to reduce the rectifier output and thus to bring the battery voltage into the floating range.

If the voltage of battery B raises or lowers out of the floating range sufficiently to cause an unbalance in the bridge of approximately twice the magnitude required to operate relays 310 or 312, relay 311 will operate. The function performed by relay 311 will be described more fully hereinafter.

Having described the general operation of the rectifier and voltage control circuits, the following description will be directed to the operation of the system as a whole, showing the manner in which the connecting circuits function to adjust the number of rectifiers in service in accordance with the requirements of the load.

Figure 2:
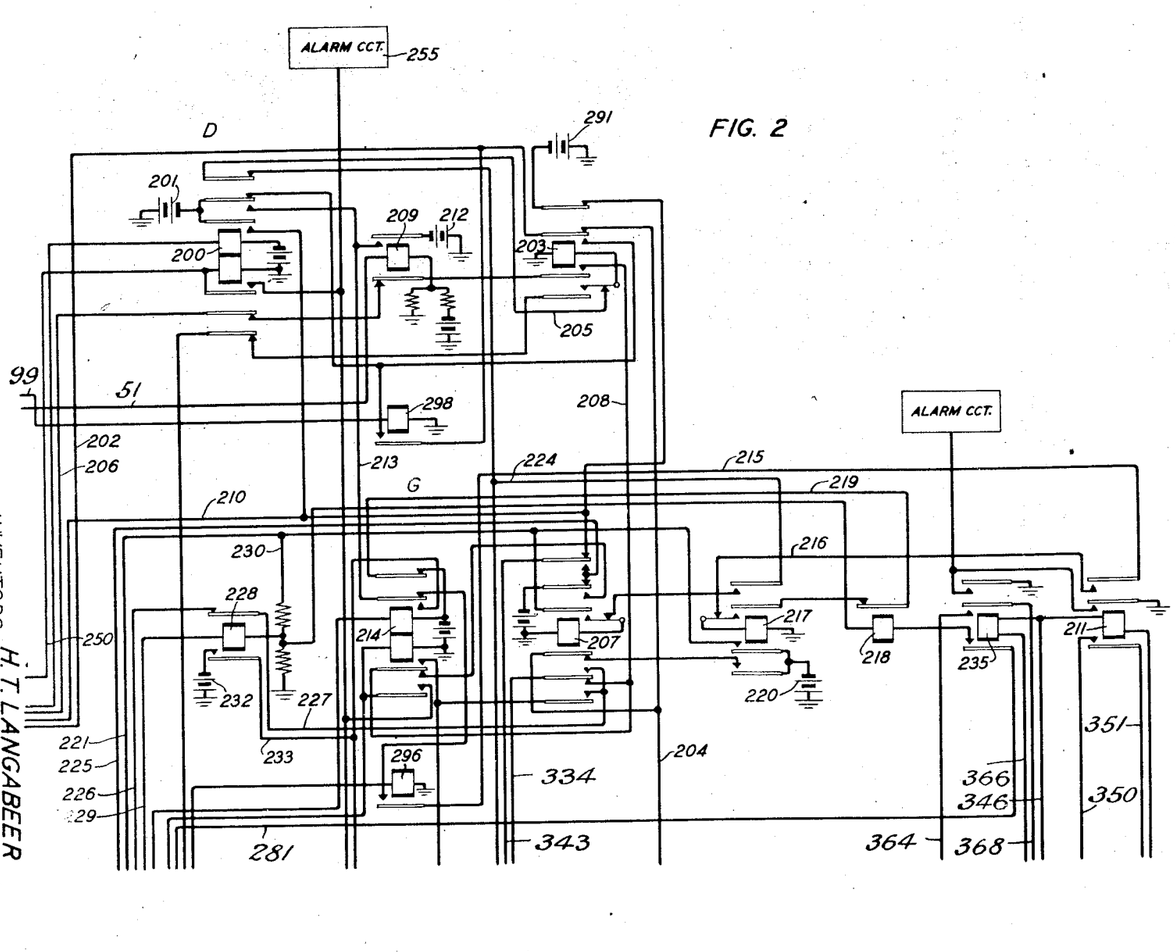
Fig. 2 and the upper portion of Fig. 3 illustrate three connecting circuits, each one of which is individual to one of the rectifiers shown or indicated in Figs. 1 and 4.

For the purpose of describing the operation of the invention it will be assumed that there are three rectifiers X, Y and Z, each arranged in accordance with rectifier X of Fig. 1. Rectifier X is associated with connecting circuit D (Fig. 2), rectifier Y with circuit G and rectifier Z with circuit F. It is to be understood that the system is not limited necessarily to three rectifiers.

With key 21 in normal position and key 20 in the "on" position illustrated, a circuit exists extending from grounded battery 291, outer upper armature and back contact of relay 203, conductor 210, contacts 42 of key 21, normal closed contacts of key 43, conductor 44, armature and front contact of limit switch L, conductor 99 to ground through the winding of relay 298. Relay 298 operates in this circuit whereupon a circuit exists which extends from grounded battery 201, middle upper armature and back contact of relay 200, front contact and armature of relay 298, conductor 202, contacts 22 of key 21, conductor 23, armature and back contact of relay 24, conductor 25, winding of contactor relay 26, conductor 28, contacts 29 of key 20 to ground at 30. Contactor relay 26 is operated in this circuit and, as is apparent, functions to connect the rectifier circuit to the alternating current supply source 15 by way of the line L. It will also be noted that relay 26, at its next to lowermost set of contacts closes the negative direct current charge lead of the rectifier circuit to the battery B by interconnecting the leads 31 and 32. At the same time relay 324 (Fig. 3) is energized in a circuit extending from grounded battery 201, middle upper armature and back contact of relay 200, front contact and armature of relay 298, inner upper armature and back contact of relay 203, conductor 204, winding of relay 324, back contact and lower armature of relay 325 to ground. Relay 324 is a dash-pot relay and requires three to four minutes to operate.

When relay 324 finally operates, it completes a circuit extending from grounded battery 326, closed contacts of relay 324, conductor 327', back contact and outermost upper armature of relay 200, normal make-before-break contacts and winding of start relay 203 to ground. Relay 203 operates in this circuit and locks in a circuit extending from grounded battery 327, outer upper armature and back contact of relay 325, conductor 328, outermost lower armature and back contact of relay 200, outer lower armature and front contact and winding of relay 203 to ground. At its inner upper armature, relay 203 opens the operating circuit to relay 324. At its inner upper armature and front contact, relay 203 also shunts the contacts of relay 298. At its inner lower armature and front contact, relay 203 connects the lead 208 to the circuit of rectifier X, the said lead 208, passing through normal contacts of relays 207 and 333 of connecting circuits G and F and finally terminating at the left contact of relay 312 in the regulator bridge circuit. Thus it is that control relay 312 of the regulator bridge circuit is associated with rectifier X and is ready to regulate the output thereof in a manner which will be presently described.

The voltage of battery B being low and outside the floating range, the regulator bridge will be unbalanced in a manner previously described and relay 312 will operate. Relay 312 operated, establishes a circuit which may be traced from grounded battery 327, inner upper armature and back contact of relay 325, armature and left contact of relay 312, conductor 330, upper normal contacts of "auto-manual" key 331, conductor 332, outer lower armature and back contact of relay 333, conductor 334, middle lower armature and back contact of relay 207, conductor 208, front contact and inner lower armature of relay 203, lower armature and back contact of relay 209, back contact and middle lower armature of relay 200, conductor 206, normal contacts of "raise" key 35, conductor 36, limit switch R and its normal contact 37, winding of relay 10 to ground at 30. Relay 10 operates in this circuit and functions in the manner previously described to cause the output of rectifier X to be increased. As the rectifier output is increased, the B battery voltage is brought into the floating range, the balanced condition of the regulator bridge is attained and relay 312 is deenergized. Each time the load increases sufficiently to cause the battery voltage to decrease to its low voltage floating value, the above operation will be repeated, thus increasing the rectifier output.

Should the load decrease and the voltage of battery B increase to its upper floating value, the regulator bridge is unbalanced in the opposite direction and relay 310 operates. Relay 310 operated, completes a circuit extending from grounded battery 340, armature and right contact of relay 310, conductor 341, lower normal contacts of key 331, conductor 342, outermost upper armature and back contact of relay 333, conductor 343, outermost upper armature and back contact of relay 207, conductor 210, contact 42 of key 21, normal contacts of "lower" key 43, conductor 44, right contact of limit switch L, conductor 45, winding of relay 11 to ground at 30. Relay 11 operates in this circuit and functions to decrease the output of rectifier X and lower the voltage impressed on battery B.

Thus far it has been described how the output of rectifier X is increased or decreased as the voltage of battery B reduces or increases to its low or high voltage floating values respectively, and the voltage of battery B regulated.

It will now be described how a second rectifier Y is placed in service in conjunction with rectifier X when the output of the latter increases to its full load ampere output.

When the output of rectifier X increases to its full load ampere output, ammeter relay AR operates to close its right contact 50 thereby connecting ground to the lead 51 which results in the operation of relay 209 in an obvious circuit. Under this condition and when the voltage of battery B decreases to its low floating value due to an increase in load, relay 312 operates in a manner fully described hereinbefore. With relay 209 operated, the lead 206 to rectifier X is opened at the lower armature of relay 209 so that the operation of relay 312 causes no further increase in the output of rectifier X.

With a slight further decrease in battery voltage the regulator bridge relay 311 operates completing a circuit from ground over its armature and front contact, conductor 346, winding of relay 211, conductor 345, left contact and armature of relay 310 to grounded battery 340. Relay 211 operates in this circuit and at its upper armature and front contact completes a circuit extending from grounded battery 212, upper armature and front contact of relay 209, conductor 213, inner upper armature and back contact of relay 214, front contact and armature of relay 296, conductor 215, outer upper armature and front contact of relay 211, conductor 216, normal make-before-break contacts and winding of relay 217 to ground. Relay 217 is the start relay of connecting circuit G which is individual to rectifier Y. Relay 217 operates in this circuit and locks in a circuit extending from grounded battery, back contact and outer armature of relay 214, conductor 219, armature and back contact of relay 218, inner upper armature and front contact and winding of relay 217 to ground.

At its inner lower armature and front contact, relay 217 connects battery 220 to the lead 221 which extends to the rectifier Y and corresponds to the lead 202 of rectifier X. With battery connected to lead 221, the contactor relay of rectifier Y corresponding to relay 26 of rectifier X operates to perform functions similar to those performed by relay 26. Thus the rectifier Y is placed in operation and connected to the battery B.

At its outer lower armature and front contact relay 217 completes a circuit extending from grounded battery 220, outer lower armature and front contact of relay 217, back contact and innermost lower armature of relay 207, conductor 204, winding of dash-pot relay 324, back contact and lower armature of relay 325 to ground. Relay 324 operates in this circuit after its delay of three to four minutes and connects battery 326 to lead 327', conductor 224, outer upper armature and front contact of relay 217, normal make-before-break contacts and winding of relay 207 to ground. Relay 207 operates and locks in an obvious circuit under control of relay 217.

Relay 207, at its middle lower and outermost upper armatures transfers the leads 343 and 334 from rectifier X to rectifier Y, thereby transferring the regulator bridge control relays 310 and 312 from rectifier X to rectifier Y. Thus, any variations in the voltage of battery B will now serve to adjust the output of rectifier Y instead of rectifier X. Thus it will be noted that when the full load ampere output of rectifier X is reached and the battery voltage drops below the floating range, relay AR and control relay 311 cooperate in causing a second rectifier Y to be connected in parallel with rectifier X to supply the load. It is also noted that the control effected by control relays 310 and 312 of the voltage regulating circuit is now directed to rectifier Y.

Under the conditions just described and when the regulator bridge relay 312 operates in response to a decrease in battery voltage, battery 327 will be extended to the lead 226 of rectifier Y by way of the inner upper armature and back contact of relay 325, armature and left contact of relay 312, conductor 330, upper contacts of key 331, conductor 332, outer lower armature and back contact of relay 333, conductor 334, middle lower armature and front contact of relay 207 of connecting circuit G, conductor 227, upper armature and back contact of relay 223 and conductor 226. Conductor 226 of rectifier Y corresponds to conductor 206 of rectifier X so that a relay of rectifier Y corresponding to relay 10 of rectifier X functions to increase the output of rectifier Y and raise the voltage of battery B.

Likewise, when regulator bridge relay 310 operates in response to an increase in battery voltage, battery 340 is connected to the lead 225 of rectifier Y by way of the armature and right contact of relay 310, conductor 341, lower contacts of key 331, conductor 342, outermost upper armature and back contact of relay 333, conductor 343, outermost upper armature and front contact of relay 207 to conductor 225. Conductor 225 of rectifier Y corresponds to conductor 210 of rectifier X so that when relay 310 operates, a relay of rectifier Y similar to relay 11 of rectifier X operates to cause the output of rectifier Y to be lowered and the battery voltage reduced.

When the output of rectifier Y reaches its full load ampere output, the ammeter relay of rectifier Y corresponding to relay AR of rectifier X functions to place ground on the lead 229 which causes relay 228 of connecting circuit G to operate in a circuit to grounded battery 220 and including the inner lower armature and front contact of relay 217 and conductor 230. Relay 228, at its upper armature, opens the lead 226 which, as in the previous case, prevents any further operation of the relay of rectifier Y corresponding to relay 10 of rectifier X. At its lower armature relay 228 prepares an operating circuit for start relay 347 of connecting circuit F.

When the voltage of battery B decreases sufficiently to cause the operation of regulator bridge relay 311, relay 211 operates in a circuit extending from grounded battery 340, armature and left contact of relay 310, conductor 345, winding of relay 211, conductor 346, front contact and armature of relay 311 to ground. Relay 211 operates in this circuit and, at its lower armature and front contact, completes an operating circuit for relay 347 of connecting circuit F which extends from grounded battery 232, front contact and lower armature of relay 228, conductor 233, outer upper armature and back contact of relay 349, front contact and armature of relay 399, conductor 350, front contact and lower armature of relay 211, conductor 351, normal make-before-break contacts and winding of relay 347 to ground. Relay 347 operates and locks to battery 352 under control of relays 349 and 354.

At its inner lower armature and front contact, relay 347 connects battery 355 to conductor 358 leading to rectifier Z. Conductor 358 corresponds to conductors 202 and 221 of rectifiers X and Y respectively, and when battery potential is connected thereto the contactor relay of rectifier Z corresponding to relay 26 of rectifier X operates to cause the rectifier Z to function in a manner which should now be apparent. At its outer lower armature relay 347 connects battery to the winding of dash-pot relay 324 which, after the usual delay of from three to four minutes, operates to ground at the back contact and lower armature of relay 325. Relay 324 operated, causes relay 333 to operate in a circuit extending from grounded battery 326, contacts of relay 324, conductors 327' and 357, outer upper armature and front contact of relay 347, normal make-before-break contacts and winding of relay 333 to ground. At its inner lower armature, relay 333 opens the circuit to relay 324 and at its inner upper armature and front contact locks under control of relay 347. The other functions of relay 333 are the same as those of relay 207 previously described. The rectifier Z is now connected in parallel with rectifiers X and Y across the battery and load and the control of regulator bridge relays 310 and 312 has been transferred to rectifier Z from rectifier Y.

The output of rectifier Z is regulated in exactly the same manner as the outputs of rectifiers X and Y and it is believed unnecessary to repeat the description here.

As the load decreases, the battery voltage will increase and each time relay 310 operates it will cause the rectifier Z to function and reduce its output. When the rectifier Z reduces its output to a value where the associated ammeter relay (AR of rectifier X) closes its low or left contact, ground will be connected to lead 364 which corresponds to the lead 53 of rectifier X. (The lead 53 corresponds to leads 281 and 364 of rectifiers Y and Z, respectively, and is not essential to the operation of rectifier X. It has been illustrated merely to indicate how the leads 281 and 364 are grounded when their associated ammeter relays, which correspond to relay AR of rectifier X, close their left contacts.) When the battery voltage rises slightly above the floating value, regulator bridge relay 311 operates in the usual manner, whereupon relay 235 operates in a circuit extending from grounded battery 327, inner upper armature and back contact of relay 325, armature and right contact of relay 312, conductor 366, winding of relay 235, conductor 346, front contact and armature of relay 311 to ground. Relay 235 operates in this circuit and ground on lead 364 is now extended over the front contact and inner upper armature of relay 235, winding of relay 354, conductor 368 to battery 355 and ground by way of the inner lower armature and front contact of relay 347.

Relay 354 operates in this circuit and opens the locking circuit for relay 347 causing the release of this relay. Relay 347 released, disconnects battery from lead 358 causing the contactor relay of rectifier Z (relay 26 of rectifier X) to release and disconnect the rectifier from the line L and from the battery B. Relay 333 restores its armatures when relay 347 releases thereby transferring the control of the regulator bridge relays 310 and 312 from rectifier Z to rectifier Y. When the voltage of battery B decreases to the floating value, relay 311 releases and in turn releases relay 235. As the load continues to decrease, the rectifier Y will be disconnected from the load in the same manner as outlined for rectifier Z. Rectifier X is arranged for continuous operation and will remain in operation to carry the load during the light load period.

Though the following functions performed by the system disclosed do not constitute a part of the present invention, it may be well to describe them.

In the event of service failure, the alternating current supply to the rectifiers will be discontinued, causing the output of the rectifiers to reduce to zero and causing ground at the contact of the associated ammeter relay to be connected to the leads corresponding to the lead 364 of rectifier Z. This ground performs the same functions described hereinbefore. At the same time failure of the source 320 to transformer T4 releases the normally operated relay 370 causing relay 325 to operate. Relay 325 operated, disconnects battery from the armature of relay 312 and connects battery to lead 342 and lead 366. Relay 325 operated, opens the locking circuit to relay 203 causing this relay to release. Battery on conductor 366 operates the relay 235 which, through its contacts completes circuits for the operation of such relays as 218 and 354 which operate to release their associated relays 217 and 207 and 347 and 333. Battery from relay 325 connected to the lead 342 causes the rectifier to operate to its no-load position. Relays 207 and 333 released, will connect battery 327 over leads 225 and 362 to the associated rectifiers Y and Z causing them to operate at no load.

Upon restoration of the power service supply, relay 370 operates which in turn releases relay 325. Relay 325 released disconnects battery 327 from the leads 366 and 332 and connects battery to the armatures and contacts of relays 312 and 200, the latter by way of conductor 380. Rectifier X will start up immediately and connect to the load in the same manner as previously outlined. The battery voltage being low relays 312, 311 and 211 will operate in a manner fully described hereinbefore. The rectifier output will reach its full load ampere output and ground will be connected over lead 51 in the manner now apparent from a preceding description causing relay 209 to operate. Rectifier Y starts in the same manner as previously outlined and connects to the battery.

Reverting back to the rectifier circuit shown in detail in Fig. 1 it will be recalled that when the high or right contact of ammeter relay AR closes, ground is connected to lead 51 to the connecting circuit D causing the control to function and prevent the output of the rectifier being increased by opening the lead 206. When the low or left terminal of the ammeter relay is closed ground is connected through the lead 53 which serves no useful purpose since rectifier X, being the first rectifier in the group, is arranged for continuous operation. Resistances 70 and 71 and condensers 72 and 73 at the ammeter relays are used for contact protection. If the rectifier is operating in the condition where it is prevented from increasing its current by the operation of the left contact of ammeter relay AR, an increase in the alternating current input voltage or a decrease in the voltage of battery B will cause the rectifier current to increase even though the position of autotransformer TR remains the same. In order to reduce the output current to the full load value, relay 72' is connected across the ammeter relay shunt in series with rheostat 73'. The rheostat is adjusted so that relay 72' operates when 32 amperes flow through the shunt, which is slightly above the value of 30 amperes at which the "high" or right contact of the ammeter relay closes. Relay 72' operated, puts ground at 30 on one side of the winding of relay 75, the other side being connected to battery. Relay 75 accordingly operates and connects battery to the lead 76 between the keys 21 and 43. This battery through the normal contacts of key 43 operates relay 11 thus reducing the output of the rectifier in the manner previously described, until the current through the ammeter relay shunt reaches a value of 28 amperes to cause the release of relay 72. Relay 75 then releases and removes battery from relay 11. Battery from relay 207 and through contacts of relays 214, 203, 209 and 200 causes output of rectifier to again be increased to 30 amperes.

The relay 24 has its winding connected in series with the primary winding of the rectifier plate supply transformer T1. The normal full load alternating current of the rectifier will not operate relay 24 but if the current exceeds approximately three times normal current, due to a flashover in the tubes, it operates and opens the circuit of the contactor 26. The consequent release of relay 26 turns off the rectifier and extinguishes the flashover. As soon as the alternating current reduces to zero, relay 24 releases and its contacts reoperate relay 26 to start the rectifier.

Key 20 is provided to manually open the circuit to contactor 26 to stop the rectifier from charging. The contactor 26 also opens the negative charge lead 31 but does not disconnect the rectifier control circuit. Key 20 also causes relay 200 to operate and causes control circuit, Fig. 1, to restore to normal and also rotate transtat to extreme lower position.

Keys 35 and 43 provide a means of controlling the output current of the rectifier for manual control or for inspection of the operation of the motor M and its control circuit.

Key 21 is provided as a means to remove a rectifier from service when used as part of an automatic plant.

Should the rectifier tubes V1 or V2 fail, the charging current reduces to a small value so that the ammeter relay would function so as to actuate the control in a manner hereinbefore described and to cause relay 10 to operate. Under this condition, the autotransformer arm 12 would be driven to the end of its travel to operate limit switch R to the left. A circuit for the operation of relay 80 is thus established. Relay 80 operated, locks independent of the limit switch R. At its right armature relay 80 establishes a circuit extending from battery B, conductors 301, 323, 400, 82 and 83, left contacts of switch 20, right armature and front contact of relay 80, conductor 84, resistance 81, conductor 250 to ground through the lower winding of relay 200. Relay 200 operates in this circuit and removes battery 201 from conductor 202 causing the release of contactor switch 26 causing the rectifier to be stopped. At its lower armature and front contact relay 200 locks and brings in an alarm in the alarm circuit 255. After the circuit has been restored to normal relay 80 is released by momentarily actuating key 20.

When the power fails the connecting circuit puts battery on the rectifier lead 210 in a now well-known manner which, as hereinbefore described, causes relay 11 to operate but, since there is no power to run the motor M, the circuit stands in this condition until the power is restored, then the motor M drives the arm 12 so as to actuate limit switch L. This operation puts battery on the lead 90 to inform the connecting circuit that the rectifier is ready to be started in the usual way.

What is claimed is:

1. In a system of distribution, the combination of alternating current supply mains, a variable direct current load having a storage battery associated therewith, a plurality of rectifiers, means for regulating the output of said rectifiers in accordance with variations in the voltage of said battery, and means including a relay controlled by said regulating means for causing said rectifiers to be connected to said mains and to said load in a definite order in accordance with load increases, and to be disconnected from said mains and said load in the reverse order as the load decreases.

2. In a system of distribution, the combination of alternating current supply mains, a variable direct current load having a storage battery associated therewith, a plurality of rectifiers for converting alternating current from said mains into direct current and feeding it to said load and to said battery, a single regulating circuit adapted for use with each of said rectifiers for regulating the output thereof in accordance with variations in the voltage of said battery, and control means included in said regulating circuit and responsive to a decrease in battery voltage subsequent to a load increase of a predetermined magnitude for increasing the number of rectifiers supplying the load.

3. In a system of distribution, the combination of alternating current supply mains, a variable direct current load having a storage battery associated therewith, a plurality of rectifiers connected in parallel and supplying said load with rectified current, a regulating circuit arranged to regulate the output of one of said rectifiers in accordance with variations in the voltage of said battery, and control means in said regulating circuit responsive to an increase in battery voltage subsequent to a load decrease of a predetermined magnitude for disconnecting said one rectifier from said load.

4. In a system of distribution, the combination of alternating current supply mains, a variable direct current load having a storage battery associated therewith, a plurality of rectifiers adapted to convert alternating current from said mains into direct current and feed it to said load and battery, a single regulating circuit adapted for use with each of said rectifiers having control means which function to control the output of the rectifiers in accordance with variations in the voltage of said battery, and other means responsive to a decrease in battery voltage subsequent to a load increase of predetermined magnitude for increasing the number of rectifiers supplying the load, and means operating a predetermined period of time after an increase in the number of rectifiers supplying the load for transferring the control means of said regulating circuit to the last connected rectifier.

5. In a system of distribution, the combination of alternating current supply mains, a variable direct current load having a storage battery associated therewith, a rectifier connected between said mains and said load, a current responsive device for said rectifier operating in response to a rectifier output of predetermined value, a second rectifier, a voltage regulating circuit, means controlled by said voltage regulating circuit and operating in response to a variation in the voltage of said battery of predetermined value, and means responsive to the conjoint operation of said current responsive means and the regulating circuit controlled means for connecting said second rectifier between said mains and said load.

6. In a system of distribution, the combination of alternating current supply mains, a variable direct current load having a storage battery associated therewith, a rectifier connected between said mains and said load, an ammeter relay individual to said rectifier and responsive to variations in the output thereof, a voltage regulating circuit including a bridge circuit whose galvanometer arm is devoid of current when the voltage of said battery is within predetermined limits, a relay included in the galvanometer arm of said bridge, a second rectifier, and means responsive to the operation of said bridge relay after said ammeter relay functions to indicate a rectifier output of predetermined value for connecting said second rectifier between said mains and said load.

7. In a system of distribution, the combination of alternating current supply mains, a variable direct current load having a storage battery associated therewith, a plurality of rectifiers for converting current from said mains into direct current and feeding it to said load and said battery, means for connecting the first of said rectifiers to said load, a voltage regulating circuit, means controlled by said regulating circuit for varying the output of the connected rectifier in accordance with variations in the voltage of said battery, current controlled means individual to the connected rectifier and responsive to a predetermined output thereof, and other means controlled by said regulating circuit and effective subsequent to the operation of said current controlled means for connecting another of said rectifiers to said load and to said supply mains.

8. In a system of distribution, the combination of alternating current supply mains, a variable direct current load having a storage battery associated therewith, a rectifier connected between said mains and said load, a voltage regulating circuit associated with said load, means for adjusting the output of said rectifier, means controlled by said regulating circuit for operating said adjusting means in accordance with variations in the voltage of said battery, current responsive means for said rectifier, a second rectifier, means for connecting said second rectifier to said mains and to said load, a switching device individual to said second rectifier for controlling the operation of said connecting means, means controlled by said current responsive means for preparing an operating circuit for said switching device when said current responsive means operates in response to a rectifier output of a predetermined value, and a relay controlled by said regulating circuit and responsive to a variation in the voltage of said battery of predetermined value for completing the circuit to said switching device whereby said second rectifier is connected to said mains and to said load.

9. In a system of distribution, the combination of alternating current mains, a variable direct current load having a storage battery associated therewith, a rectifier connected between said mains and said load, a voltage regulating circuit associated with said load, means for adjusting the output of said rectifier, control means in said regulating circuit for operating said adjusting means in accordance with variations in the voltage of said battery, current responsive means for said rectifier, a second rectifier, means for connecting said second rectifier to said mains and to said load, a switching device individual to said second rectifier for controlling the operation of said connecting means, means controlled by said current responsive means for preparing an operating circuit for said switching device when said current responsive means operates in response to a rectifier output of predetermined value, a relay controlled by said regulating circuit and responsive to a variation in the voltage of said battery of predetermined value for completing the circuit to said switching device whereby said second rectifier is connected to said means and to said load, and time delay means controlled by said switching device for transferring said regulating circuit control means from said first rectifier to said second rectifier.

10. In a system of distribution, the combination of alternating current mains, a load circuit, a storage battery associated therewith, a first rectifier interposed between said mains and said load and supplying direct current to said load and said battery, a regulating circuit connected across said battery and including a bridge, one arm of which includes the plate-cathode resistance of a vacuum tube having a control electrode, said bridge being balanced at the normal regulated value of the battery voltage, means responsive to variations in the battery voltage from the regulated value for altering the potential of said control electrode to cause corresponding conditions of unbalance in said bridge, a relay in the galvanometer arm of said bridge responsive to bridge unbalances in one direction to increase the output of said rectifier, a second relay responsive to bridge unbalances in another direction to increase the output of said rectifier, a second relay responsive to bridge unbalances in another direction to decrease the output of said rectifier, a second rectifier, switching means for connecting said second rectifier in parallel with said first rectifier, means included in the output circuit of said first rectifier and responsive to the full load ampere output of said first rectifier for preparing a circuit for said switching means, and a third relay in the galvanometer arm of said bridge serially connected with said other two relays and responsive to a bridge unbalance of a predetermined magnitude for completing the operating circuit of said switching means and causing its operation.

11. In a system of distribution, the combination of alternating current supply mains, a variable direct current load having a storage battery associated therewith, a plurality of rectifiers for converting alternating current from said mains into direct current and feeding it to said load circuit, and means for progressively increasing the number of rectifiers supplying said load in accordance with load requirements, said means comprising a voltage regulating circuit adapted for use with each of said rectifiers, current controlled means individual to each of said rectifiers, and means controlled by said regulating circuit and effective subsequent to the operation of the current controlled means of a connected rectifier for causing the connection of another of said rectifiers to said load.

12. In a system of distribution, the combination of alternating current supply mains, a variable direct current load having a storage battery associated therewith, a first rectifier interposed between said mains and said load and supplying rectified current to said battery and load, a plurality of other rectifiers, switching means individual to each of said other rectifiers for connecting them across said battery in parallel with said first rectifier, means individual to each of said rectifiers and responsive to a predetermined current output thereof for preparing an operating circuit for the switching means of a succeeding rectifier, and means responsive to a predetermined battery voltage for thereafter completing the operating circuits of said switching means.

13. In a system of distribution, an alternating current supply, a variable direct current load having a storage battery associated therewith, a plurality of regulated rectifiers, a single voltage regulating circuit adapted for use with each of said rectifiers for regulating the outputs thereof, and means for automatically successively connecting said rectifiers between said supply and said load in accordance with load increases beyond certain predetermined limits, said means including a relay in said regulating circuit and current responsive means individual to each of said rectifiers.

14. In a system of distribution, an alternating current supply, a variable direct current load having a storage battery associated therewith, a plurality of regulated rectifiers, a single voltage regulating circuit adapted for use with each of said rectifiers for regulating the outputs thereof and means for automatically connecting said rectifiers between said supply and said load in a definite order in response to load increases of predetermined magnitudes and for disconnecting them in the reverse order in response to load decreases of predetermined magnitudes, said means including a relay in said regulating circuit and current responsive means individual to each of said rectifiers.

15. In a system of distribution, an alternating current source, a direct current load circuit having a storage battery connected thereacross, a rectifier for transmitting rectified current from said source to said battery and load, and means for controlling the output of said rectifier comprising a bridge circuit connected across said battery whose condition of balance varies with variations in the voltage of said battery, a pair of relays included in the galvanometer arm of said bridge responsive to bridge unbalances produced by variations in the voltage of said battery, a third relay connected in series with said pair of relays and responsive to a bridge unbalance of predetermined magnitude, means for adjusting the output of said rectifier and means controlled by said relays for controlling the operation of said adjusting means.

16. In a system of distribution, an alternating current source, a direct current load circuit having a storage battery connected thereacross, a rectifier for transmitting rectified current from said source to said load and battery, and means for controlling the output of said rectifier in accordance with variations in the voltage of said battery, said means comprising a bridge circuit connected across said battery which is balanced at the regulated value of the voltage of said battery, a pair of relays responsive to bridge unbalances of magnitudes within predetermined limits caused by variations in the voltage of said battery, a third relay responsive to a bridge unbalance in excess of the said predetermined limits, said three relays being connected in series across the galvanometer arm of said bridge, and means controlled by said relays for controlling the output of said rectifier.

17. In a system of distribution, an alternating current source, a direct current load circuit having a storage battery connected thereacross, a rectifier for transmitting rectified current from said source to said battery and load, a bridge circuit connected across said battery whose condition of balance varies with variations in the voltage of said battery, a relay responsive to bridge unbalances in one direction, a second relay responsive to bridge unbalances in another direction, said relays being included in the galvanometer arm of said bridge, means for adjusting the output of said rectifier, means controlled by said relays for controlling the operation of said adjusting means, and means including a relay connected in series with said first and second relays and responsive to a bridge unbalance in either direction of predetermined magnitude for rendering said first or second relays ineffective in further controlling said adjusting means.

18. In a system of distribution, an alternating current supply, a direct current load having a storage battery connected thereacross, a rectifier of the gas-filled tube type for supplying rectified current from said source to said load and battery, a transformer for supplying plate voltage to the rectifier, the plate electrodes of said rectifier being connected to the secondary of said transformer, a variable transformer connected across said alternating current source, a booster transformer connected between one terminal of said variable transformer and a variably positionable arm thereof which functions to vary the number of effective turns of said variable transformer, said booster transformer being interposed between the said variable transformer and the primary of said plate transformer, and means for variably positioning the arm of said variable transformer to vary the number of effective turns of said variable transformer, whereby the potential applied to the plate electrodes of said rectifier is varied, comprising means responsive to variations in the voltage of said battery and means controlled thereby for operating the variably positionable arm of said variable transformer.

19. In a system of distribution, an alternating current source, a direct current load having a battery connected thereacross, a rectifier for supplying rectified current from said source to said load and battery, said rectifier including a discharge tube having a plate and filament, a transformer associated with said source for supplying plate potential to said tube, an autotransformer associated with said plate transformer, control means for varying the number of effective turns of said autotransformer, to correspondingly vary the potential applied to the plate of said tube, and means for controlling the operation of said control means in accordance with variations in the voltage of said battery comprising a bridge circuit connected across said battery and balanced at a predetermined value of voltage thereof, and relay means included in the galvanometer arm of said bridge and responsive to bridge unbalances caused by departures of the battery voltage from the predetermined value.

20. In a power plant, a source of alternating current, a load circuit having a storage battery connected thereacross, a rectifier for supplying rectified current from said supply to said load and battery, a booster transformer interposed between said supply and said rectifier, means for varying the number of turns of said booster transformer to control the output of said rectifier accordingly, and means for controlling the operation of said booster control means comprising a bridge circuit connected across said battery and normally balanced at a predetermined value of voltage of said battery, and relay means included in the galvanometer arm of said bridge responsive to bridge unbalances caused by variations in the voltage of said battery from the said predetermined value.

21. In a power plant, a source of alternating current, a load circuit having a battery connected thereacross, a rectifier for supplying rectified current from said source to said load and battery, means comprising a booster transformer interposed between said source and said battery whose number of effective turns determines the output of said rectifier, means for controlling the number of effective turns of said booster transformer, and means for controlling the operation of said booster control means comprising a bridge circuit connected across said battery and being balanced at a predetermined voltage of said battery, a relay included in the galvanometer arm of said bridge responsive to a bridge unbalance corresponding to a decrease in battery voltage from said predetermined value for operating said booster control means to increase the number of effective turns of said booster transformer, and a second relay connected in series with said first relay and responsive to a bridge unbalance corresponding to an increase in battery voltage from said predetermined value for operating said booster control means to decrease the number of effective turns of said booster transformer.

HARVEY T. LANGABEER.
DAVID E. TRUCKSESS.